(12) United States Patent
Böckling et al.

(10) Patent No.: US 6,546,727 B2
(45) Date of Patent: Apr. 15, 2003

(54) HYDRAULIC SYSTEM

(75) Inventors: Marcus Böckling, Ottersweier (DE); Thomas Rammhofer, Sasbach (DE); Joachim Pfeiffer, Bühlertal (DE); Jan Grabenstätter, Gernsbach (DE)

(73) Assignee: Luk Lamellen und Kupplungsbau Beteiligungs KG, Bühl (DE)

( * ) Notice: Subject to any disclaimer, the term of this patent is extended or adjusted under 35 U.S.C. 154(b) by 81 days.

(21) Appl. No.: 09/796,091

(22) Filed: Feb. 28, 2001

(65) Prior Publication Data
US 2001/0025489 A1 Oct. 4, 2001

(30) Foreign Application Priority Data
Feb. 29, 2000 (DE) .......................... 100 09 572

(51) Int. Cl.[7] .................................. F15B 7/00
(52) U.S. Cl. ................ 60/591; 137/493; 137/493.8
(58) Field of Search .................... 60/591; 137/493, 137/493.8, 512.4, 853

(56) References Cited

U.S. PATENT DOCUMENTS

| | | | | |
|---|---|---|---|---|
| 4,386,807 A | * | 6/1983 | Haar | 137/493 |
| 4,392,511 A | * | 7/1983 | Schopper | 137/493.2 |
| 5,052,759 A | * | 10/1991 | Tanaka | 251/337 |
| 5,692,813 A | * | 12/1997 | Vellmer | 137/377 |
| 5,937,988 A | * | 8/1999 | Otto et al. | 60/591 |

* cited by examiner

Primary Examiner—Edward K. Look
Assistant Examiner—Igor Kershteyn
(74) Attorney, Agent, or Firm—Alfred J. Mangels

(57) ABSTRACT

An hydraulic system that includes a master cylinder, a slave cylinder, a fluid conduit extending between the cylinders, and a pressure relief valve within the conduit between the cylinders. The pressure relief valve includes at least one port that is closed by an elastic member that overlies the port and that opens when fluid pressure acting through the port exceeds a predetermined level to cause the elastic member to open the port.

42 Claims, 2 Drawing Sheets

HYDRAULIC SYSTEM

BACKGROUND OF THE INVENTION

1. Field of the Invention

The present invention relates to an hydraulic system, particularly for motor vehicles, including a master cylinder, a slave cylinder, a connecting pressure-medium conduit, as well as a pressure relief valve that is integrated into the hydraulic system and that is governed as a function of the pressure of the pressure medium.

2. Description of the Related Art

Such hydraulic systems are utilized particularly in motor vehicles as arrangements to operate brakes, as power steering systems, and as arrangements to operate friction clutches, for example in the power flow between an internal-combustion engine and a transmission, and/or an electric motor and a drive train. Dampers such as are shown in British patent No. 2,032,581 are utilized for damping pressure pulses in the pressure medium. Such damping devices include at least one closing element that is axially actuated by an energy accumulator and which, when a predetermined closure pressure is exceeded, will produce a connection between the two elements. Such arrangements are especially susceptible to periodically recurring pressure pulses in the pressure medium and react to such stimulation with, for example, screeching noises. Moreover, the sealing seats of the closure elements are susceptible to soiling, so that absolute sealing of the pressure relief valve is frequently unattainable over its lifetime.

Such situations can be a drawback if pressure conditions within the hydraulic system change, caused for example by temperature changes. Changing pressure conditions develop in the conduit before and after the pressure relief valve, so that non-negligible flows of pressure medium can take place in the hydraulic system, which can increase the moisture level in the pressure medium and therewith as a consequence can impair the quality of the pressure medium.

It is therefore an object of the present invention to provide an hydraulic system in which damping of pressure oscillations that are introduced into the pressurized medium can take place, and one that produces improved operation relative to reducing induced noises, that is more economical to manufacture, that tightly seals secondary conduits of the hydraulic system, and that is easier to assemble. Furthermore, the hydraulic system is to be filled completely through one filling point.

SUMMARY OF THE INVENTION

The object is achieved by an hydraulic system that includes a slave cylinder, a master cylinder, a pressure-medium line connecting the cylinders, as well as at least one pressure-medium controlled pressure-relief valve integrated into the system, with at least two connections for inlet and outlet of pressure medium and at least one port connecting the inlet and outlet and that is sealingly closable by an elastic element.

The port, whose one opening points in the outlet direction and whose other opening points in the inlet direction, thereby advantageously has closed by an elastic body its opening that points away from the direction of the pressure, for example in the form of an opening-spanning elastic tube valve. If a pressure is applied from the first connection through the port in the direction of the opening that is closed by the elastic, at least part of the elastic body will be displaced by the pressing force of the pressure medium and a path of pressure medium is formed away from the opening in the direction of the second connection.

The closing pressure of such a valve is determined at least by the tension force in the elastic body, by which it presses closed the opening. Furthermore, the type and extent of the closing pressure between the bearing surfaces, against which the elastic body presses, and the pressure medium path formed by the elastic body, depends upon the type and arrangement of such as, for example, the diameter of the opening, the elastic modulus of the elastic body. As well, the surface characteristics of the elastic body and the bearing surfaces can enter into the magnitude of the closing pressure and the damping characteristics. In that manner pressure spikes can be damped and the pressure relief valve can be adapted to prevailing conditions and can be matched with them. The return movement of the elastic body against the opening and the surrounding material after the decline of the pressure spike ideally is elastic, and when compared with the impact of a spring-loaded sealing element on a valve seat it is practically noiseless.

An advantageous embodiment provides an arrangement of the connections that is approximately coaxial, whereby both connections can be placed in communication with each other by a predominantly radially-extending port. It is especially advantageous—by a radially nested arrangement of the chambers that communicate with respective terminal ends of the port, which chambers communicate with the connections—that the approximately coaxial connections are axially spaced from each other, so that at least one pressure relief valve in accordance with the invention can be arranged axially between the two connections, in which a port is formed between the respective connections to the axially adjacent chambers, one that provides communication between the two connections, whereby an elastic body is arranged on an opening of the port that closes the opening as a function of the pressure of the pressure medium. The port can thereby run substantially radially from one terminal end to the other, that is, that one terminal end communicates with one chamber, or extends to it, and that it extends radially further than the chamber of the second terminal end and that forms a port that leads from radially outside to radially inside to provide communication between the two chambers.

It is to be understood that in addition the chambers can be axially overlapped by the use of a common wall, for example, a sleeve-shaped wall that is closed at one end, and the port in its radial extent also can have axial portions and can be inclined from outside to inside, or can be provided as an axially-formed open slot in the common wall, through which a simpler structure can be achieved by means of an injection molding process, and by which radial undercuts can be avoided. By the use of a sleeve-shaped construction of the common wall between the first and second connections, in each case at lease one wall surface can be cylindrically constructed and on those cylindrical surfaces, inner or outer cylindrical surfaces, the elastic body can be sealingly applied over the discharge opening. It has proved to be especially advantageous in addition to utilize tube sections, which are pulled onto the outer cylindrical surface or are put—introduce into the inner cylindrical surface to seal radially outwardly.

The tube sections can each be formed as an insert—on the inner cylinder or on the outer cylinder—for different respective opening pressures, whereby experience has shown that for the arrangement of the tube section on the inner cylinder less closing pressure is required, that is, it opens at a lower pressure of the pressure medium. Both arrangements can be constructed to be self-reinforcing, that is, the sealing function can be reinforced by counterpressure in dependence upon the applied pressure of the pressure medium. For special application cases, the bearing surfaces of the elastic body can be formed with grooves to avoid self-reinforcement and to ensure a minimal flow of pressure medium.

All kinds of elastic materials can be advantageous for the elastic body, materials that are resistant to the pressure medium, for example, brake fluid of the customary specification, and especially materials that have no negative adhesive effects such as bonding, vulcanization, adhesion, and the like with the material from which the housing is formed, which can be composed of metal, ceramic, plastic, and the like, to receive the at least one pressure relief valve. Advantageous materials have proved to be plastics, preferably elastomers, rubber, and silicon, such as silicon rubber or silicon resin. When utilizing tube sections those materials can be drawn as tubes and suitably outfitted as an insert or as finished parts, for example cast, injected, or extruded, or pressed from laminated plastic, or sawed by means of a water- or laser-beam process.

Materials for producing the elastic bodies, especially tube sections, can be reinforced, for example by means of fabrics such as textile or steel cloth and the like, or by means of spirals or rings incorporated in or installed on the surface, and which can be composed of plastic or metal. Furthermore, it can be advantageous to utilize multi-ply or multi-layer formed tube sections whereby, by way of example, the separate functions, one of providing a component that seals the opening well and one of providing a shape-conforming component, can be combined to provide increased sturdiness. For additional applications it can furthermore be advantageous to construct the elastic bodies under prestress, by way of example, a tube section arranged on an outer cylindrical surface.

It can further be advantageous to secure the hose segment against axial slippage. For that purpose one configuration can have axial stops and/or, by the application of a groove in the outer cylindrical surface over which a tube section is drawn, which extends around the periphery particularly in the area where an axial end of the tube section is inserted on the cylindrical surface, and in which the end of the tube section can be drawn, whereby it can be especially advantageous to provide a circumferential bead or a bead segment at the inner circumferential side end, which is radially gripped in the groove. Alternatively or additionally, an axially aligned, circumferential shoulder, or circumferential segments, can be provided at a radial spacing from the cylindrical surfaces—the outer or the inner cylindrical surface—to allow squeezing or clamping of the tube section between it and the cylindrical surface. It is to be understood that other fastening means, such as hose clamps, cable ties, and clamping rings can likewise be advantageous, nevertheless causing additional part costs.

In a further inventive concept that can provide an especial advantage, at least two pressure relief valves can be provided between two connections, whereby they can be arranged in an advantageous way to operate in opposition. That arrangement can thereby be provided in a separate housing that can be placed in a pressure medium conduit, or it can be integrated into a functional component that is part of an hydraulic system, for example a master cylinder or a slave cylinder, whereby relevant to the number of components especially suitable arrangements can be constructed.

The arrangement of two or more pressure relief valves in one housing provides in an especially advantageous way a so-called "pulsation filter" of a higher grade, thereby effective bi-directional damping of the transient pressure of the pressure medium can be obtained along with bi-directional filtration. Those damping arrangements can be especially advantageously arranged when they are provided with damped pressure relief valves in accordance with the invention. In addition, at least two ports can form one connection in one housing between two end connections, whereby at least one port is in contact with an elastic body of a first pressure relief valve and at least one further port is formed in contact with an elastic body of a second pressure relief valve.

It can thereby be advantageous to arrange both pressure relief valves axially spaced from each other, and/or the elastic bodies can be provided as tube sections, whereby in one pressure direction a tube section can be arranged on an outer cylindrical surface and in the other pressure direction a tube section can be arranged on the inner cylindrical surface. In doing so, in especially advantageous arrangements the pressure direction away from one slave cylinder—especially with a disengagement apparatus of a clutch with corresponding input of pressure pulses from the internal combustion engine—is damped by a pressure relief valve whose opening is closed by a tube section that is forced on the outer cylindrical surface, because a higher closing pressure can be achieved in the regulation by the application of comparable materials for tube sections, in comparison with a seal on the inner cylindrical surface. In each case the inner tube valve that is opened in the opposite pressure direction can seal in a self-reinforcing manner in the other pressure direction. By the selection of the materials and/or the installation geometry different or approximately equal opening pressures and pressure gradients can be adjusted for both pressure directions.

A further embodiment can be provided in which tube sections with approximately equal diameters are utilized, whereby the housing geometry is correspondingly proportioned.

A separately mounted pulsation filter, preferably with two oppositely-operating pressure relief valves, can be provided in one housing that is formed from at least two housing parts, which seal against each other and are axially supported. For sealing, conventional sealing means, for example an O-ring, can be utilized. Both parts can be axially connected by a further part, for example a casing, whereby the casing in each case radially engages a radially-projecting stop and that axially overlaps the connected parts. Furthermore, the housing parts can be connected together with a detent or snap connection or a bayonet catch. Advantageously at least one housing part is produced from plastic, for example by an injection molding process. Thereby the accommodations such as cylindrical walls for the elastic bodies, such as tube sections, connection means for the housing parts, such as detent hooks, bayonet hitches, and/or radial shoulders for connection means can already be formed. Furthermore, in at least one of the two parts a rotation guard against relative rotation of the housing parts with respect to each other can be provided.

Furthermore, based upon the inventive concepts it is especially advantageous to form an hydraulic system with at least one pressure relief valve having end connections joined with two conduit lines that are separated from each other and to simplify the filling operation for filling with pressure medium before starting, that the hydraulic system can be completely filled from a single filling opening, for example under the application of vacuum. In addition, in accordance with the invention a bypass is provided between the two conduit lines, that is, a bypass is made possible through the pressure medium in a range when the pressure relief valves are closed. This bypass is so arranged that it is opened only at the time of the filling procedure, and automatically closes after the filling procedure is stopped.

In addition, a seal can be provided parallel to the at least one pressure relief valve, which first becomes operational after contact with the pressure medium. For the seal, materials can be provided that swell upon contact with the pressure medium and that consequently close a gap that serves as a bypass, through swelling after contact with the pressure medium. The seal can thereby be so shaped that it allows a gap radially inside and/or radially outside, which is closed after the swelling process. Especially advantageous hereby is an insert of NBR (nitrile butadiene rubber), whereby the pressure medium is advantageously brake fluid or the like. Thereby the seal can radially seal both housing halves, whereby it can be arranged axially adjacent to a housing seal, which seals both housing parts from the outside, and between the two seals axially joins the inlet and outlet sides of a port, until the seal is swollen after the filling process and both connection ends are sealingly separated from each other, and thereby activates the at least one pressure relief valve.

Especially advantageous arrangements of an hydraulic system in accordance with the invention can be disengagement devices for hydraulically-operated friction clutches, braking devices, steering devices, and/or the like. It can be especially advantageous in the design of clutch release devices to tune the hydraulic system to damp frequencies in the region below one kiloherz, particularly between 60 and 80 Hz and especially between 80 and 100 Hz, in which range especially wavering and/or axial vibrations of the internal combustion engine are transmitted through the crankshaft to the disengagement system.

It can be especially advantageous in clutch disengagement devices when the closing pressure of a pulsation filter with oppositely operating pressure relief valves is so balanced that in the direction of the slave cylinder a residual pressure remains in effect, so that, for example, the entry of air bubbles into the conduit branch of the slave cylinder can be prevented. By this means there can be not only a reduction of effectiveness as a result of the increased compressibility resulting from the air bubbles, but moisture transfer can also be reduced, which, as experience has shown, by those air bubbles having a temperature-dependent degree of moisture, the moisture can enter the pressure medium and therewith the quality of the pressure medium can be drastically impaired, especially in the region of a poorly flushed slave cylinder, and therewith the operational reliability of the disengagement system can be endangered, especially at high temperatures.

It has proved to be advantageous to utilize pulsation filters with comparatively tightly disposed tube valves, in contrast to pulsation filters with closing bodies and valve seal seats. Advantageously the admission pressure, which operates the slave cylinder through the opening pressure of the pressure relief valve, which operates to block the outlet from the master cylinder, is adjustable. Preferably the pressure relief valve is constructed as a tube valve that has a tube section arranged on an outer cylindrical surface, that thereby can deliver higher admission pressures. It is to be understood that the admission pressure is kept small enough that in the slave cylinder is practically not axially shifted and the clutch is not axially impacted.

BRIEF DESCRIPTION OF THE DRAWINGS

The invention is further illustrated with the aid of FIGS. 1 through 5 of the drawings, in which.

DESCRIPTION OF THE PREFERRED EMBODIMENTS

Figure 1:
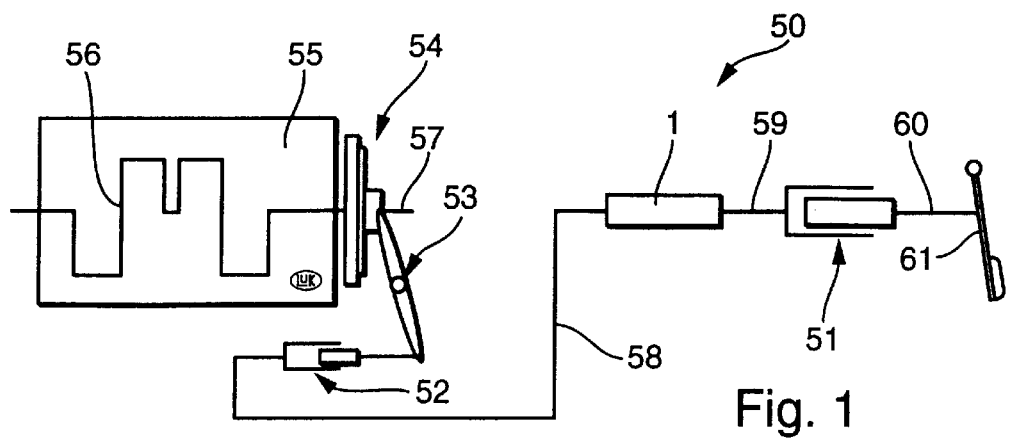
FIG. 1 is a schematic view of an hydraulic system based upon an embodiment of a clutch disengagement device in which a slave cylinder is arranged eccentrically relative to the transmission input shaft.

FIG. 1 is a schematic representation of one possible arrangement of an hydraulic system having a pressure relief valve 1 in a clutch disengagement device 50 including a master cylinder 51 and a slave cylinder 52. Pressure relief valve 1 in the illustrated embodiment is installed in conduit elements 58 and 59 and separates them from each other when in an unopened condition. It is to be understood that in other embodiments the pressure relief valve 1 can be integrated into the master cylinder 51 or into the slave cylinder 52, and in other hydraulic systems, for example brake systems, power steering systems, and the like, it can be integrated into a functional element. Furthermore, a pressure relief valve in accordance with the present invention can be utilized in an advantageous manner in hydraulic conduit systems as a pressure relief valve, and/or to advantage as an oscillation filter, for example a "pulsation" filter.

The clutch disengagement device 50 hydraulically operates the clutch 54 by loading the master cylinder 51 means of an operating member 61, which can be in the form of a foot pedal, an actuator, for example an electrical actuator, or the like. In that manner pressure is built up in master cylinder 51 by a mechanical transfer means 60, which builds up a pressure in the slave cylinder 52 through the conduit 59, the pressure relief valve 1, and the conduit 58. As shown in this embodiment, the slave cylinder 52 is able to apply by means of a disengagement mechanism 53, for example a lever having a disengagement element, and in that case a release bearing, the necessary release force to the clutch 54, that is, to its release elements, such as disk springs (not shown). Further embodiments can provide for a slave cylinder 52 that is mounted coaxially with the transmission input shaft 57 and with which the disengagement mechanism 53 is correspondingly arranged. To apply the release force the slave cylinder is at times affixed to the transmission housing, which is not more specifically shown, or that is affixed to another component that is joined to that housing. When the clutch 54 is closed, the transmission input shaft 57 transmits the torque of the internal combustion engine 55 to a transmission that is not shown in further detail, and that is connected to the drive wheels of a motor vehicle.

The crankshaft 56 experiences irregular loading as a result of the combustion processes in the internal combustion engine 55 and as a function of the arrangement of the engine, depending, for example, on the number of cylinders. The irregular loads are manifested as axial and/or wavering pulsations and are transmitted through the disengagement mechanism 53 to the slave cylinder 52, the conduits 58, 59, to the master cylinder and from there through the mechanical connection 60 to the operating member 61. If the operating member is a clutch pedal those vibrations are perceived as an annoyance. In case the operating member 61 is an actuator, such vibrations can result in, for example, reduced control accuracy, or a shortened service life. The pressure relief valve 1 is therefore inserted in conduits 58, 59 for damping purposes, and to damp and to modulate vibrations introduced by the crankshaft 56. Such vibrations typically fall in the frequency range of 50 to 200 Hz. Moreover, the pulsation filter 1, by means of a throttling function, can prevent improper operation, for example too rapid engagement of the clutch 54 through abrupt release of the operating member 61.

Figure 2:
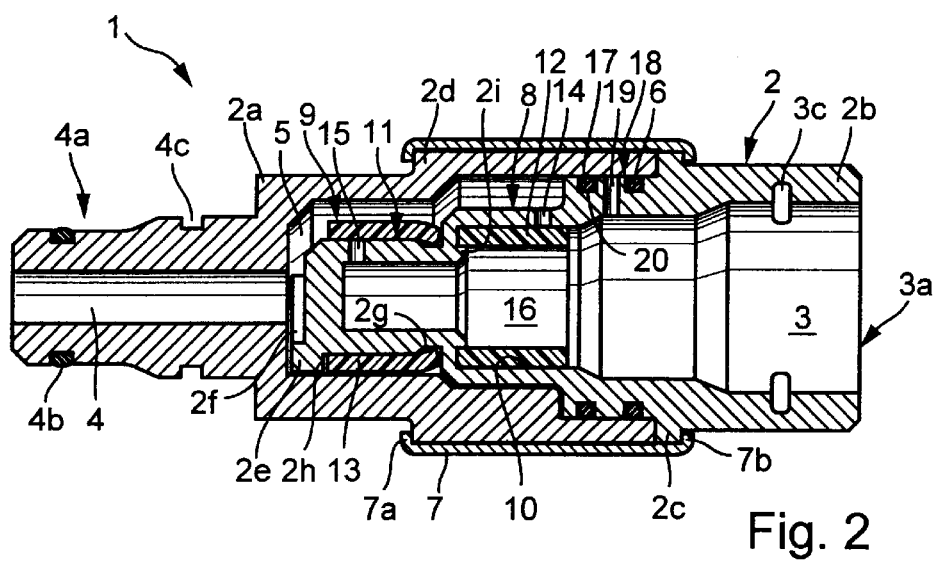
FIG. 2 is a cross-sectional view of an embodiment of a pulsation filter.

FIG. 2 shows a pulsation filter 1 which, as shown in FIG. 1, has a separate housing 2 and is installed in a hydraulic system 50 with end connections 3, 4. It is to be understood that such configurations of pressure relief valves also can be directly integrated into another component, such as a master or a slave cylinder. In the illustrated embodiment, the housing 2 is in two parts and is composed of a sleeve-like housing part 2a, with which a plug-shaped housing part 2b is axially engaged. The housing part 2b carries a radially-enlarged shoulder 2c that serves as an axial stop for the housing part 2a. The two housing parts 2a, 2b are centered with respect to each other and are sealed relative to the outside by a sealing ring 6 to form a chamber 5. The housing parts 2a, 2b are joined axially by means of a casing 7 having two formed rims 7a, 7b that encompass the radial extensions 2c, 2d, wherein during assembly casing 7 is slipped over the housing 2 and the rims 7a, 7b are shaped, for example by rolling or flanging. In other modifications of this embodiment, the casing 7 can be replaced by a self-locking element, such as, for example, a snap fastener or a snap-in or bayonet fastener, or the like. The two housing parts 2a, 2b are secured against relative rotation, for example, by means of an axially-extending lug 2e on housing part 2b, which engages a circumferentially segmented formation 2f. The end connections 3, 4 are provided with a socket 3a and plug 4a for connection with further components of the hydraulic system, whereby preferably the plug 4a of the end connection 4 runs to a slave cylinder and the plug 3a of the end connection 3 runs to a master cylinder. The plug 4a is provided with a sealing element 4b to seal the plug connection. The plug 4a and the socket 3a are axially held together with the associated connections of the pertinent conduits by means of a clip (not shown) which engages with opening 3c of the socket 3a and groove 4c of the plug 4a provided on the connections 3a and 4a.

Two pressure relief valves 8, 9 are provided in the embodiment shown in FIG. 2 and are mounted on the housing part 2b. In addition, in that construction the housing part 2b is designed in stepped form to include a first bearing surface 10 and a second bearing surface 11. In this embodiment the bearing surface 10 is formed as a cylindrical inner surface and the bearing surface 11 is a cylindrical outer surface. The bearing surfaces 10, 11 are each in contact with an elastic element, which in this embodiment are axially adjacent tube sections 12, 13 having approximately the same diameter. The tube sections 12, 13 each seal one or more circumferentially distributed ports 14, 15, which connect the chambers 5, 16 to each other and are in the form of damping ports and by their shape and diameter conform with damping requirements, whereby chamber 5 is connected to the end connection 4 and chamber 16 is connected to the end connection 3. Both tube sections 12, 13 are made from an elastic plastic or rubber material and preferably are made from a single tube and have the same diameter. Furthermore, different tube diameters or materials can be used, for example one or both of tube sections 12, 13 can be reinforced, formed from multiple plies or multiple layers, wherein with respect to a multi-layer construction at least two different layers can be superposed one above the other, and with respect to a multi-ply construction, at least two identical plies can be superposed one above the other. At least one tube section 12, 13, preferably the tube section 12, can be reinforced, for example by means of a fabric, or with rings or spirals, preferably made from plastic or metal, and again at least one tube section 12, 13, preferably the tube section 13, can be pulled onto bearing surface 11 while under tension.

The tube sections 12 can be axially affixed to the bearing surfaces 10, 11, for example, and as shown in FIG. 2, by a radially recessed groove 2g with which, in housing part 2b, especially when the tube section 13 is tensioned, a free end of the tube section 13 engages, and/or by means of a radially-enlarged axial stop 2h of the housing part 2b. A further alternative to axially affix the tube sections 12, 13 is a radially spaced, axially-enlarged stop 2i on housing part 2b, which can be designed as a circumferential segment or in the form of circumferential elements, whereby tube section 12 is inserted, or clamped, radially between the bearing surface 10 and the stop 2i. A material such as NBR, that swells when exposed to the pressure medium and thereby reinforces the clamping effect of the tube section 12, can be advantageous in this respect.

In accordance with the inventive concepts, a pulsation filter 1 is connected with additional components of the hydraulic system, which advantageously are filled before installation. To facilitate the filling procedure, which can be carried out under vacuum, a bypass 18 is provided between the end connections 3, 4 and is formed by a gap 17 and a port 19 between the gap 17 and the end connection 3. The gap 17 also communicates with the chamber 5 and thereby with the end connection 4. Because of the bypass 18, the pressure relief valves 8, 9, which desirably exhibit a defined pressure of closure, can be bypassed, thereby enabling filling of the hydraulic unit while avoiding pressures that exceed the closing pressure of the pressure relief valves 8, 9. In accordance with the inventive concepts, after filling of the hydraulic system or unit has been completed, the gap 17 is closed by a sealing ring 20, wherein the width of the gap 17 and the material, for example NBR, and the dimensions of the sealing ring 20 are selected in such a manner that following swelling of the sealing ring 20 by the action of the pressure medium, the gap 17 is sealingly closed. The resistance to pressure is so selected as to be at least larger than the lowest closing pressure of the pressure relief valves 8, 9.

The method of operation of the arrangement shown in FIG. 2 is as follows: the tube section 13 radially seals off the chamber 5 from the chamber 16 at the outside of the port 15, thus forming the pressure relief valve 9, and the tube section 12 seals off the chamber 5 from the chamber 16 radially inside the port 14, forming the pressure relief valve 8, and as a result the two pressure relief valves 8, 9 switch in opposition to each other. Upon pressure applied on the master cylinder side through the end connection 4 the pressure relief valve 8 opens, preferably at an opening pressure which is smaller than that of the pressure relief valve 9 when pressure is applied to it from the slave cylinder side through the end connection 3. In this direction of the pressure, the pressure relief valve 9 is blocked in a self-reinforcing manner. As a result a pressure can be built up and the slave cylinder can be pressurized from the master cylinder. In the case of a highly undesirable pressurization from the slave cylinder through the end connection 3, such pressurization is predominantly in the form of pressure pulses that are transmitted from the internal combustion engine in the form of axial or wavering vibrations to the slave cylinder, and are transmitted from there to the end connection 3. Upon admission of such pressure pulses, the pressure relief valve 8 closes and the pressure relief valve 9 is designed in such a way that the opening of the port 15 and the elastic pressure of the tube section 13 cooperatively dampen the pressure pulses, so that they are not transmitted to the master cylinder and hence to the clutch pedal or to a clutch actuator. Moreover the predetermined opening pressure of the pressure relief valve 9 entails a residual pressure in the conduit branch of the slave cylinder side 4, so that a reduced pressure, for example caused by temperature fluctuations in the hydraulic system, can be substantially precluded in that conduit branch. Therefore the danger is averted, or at least reduced, that moisture-laden air bubbles reach the poorly flushed zone of the slave cylinder, to thereby degrade the quality of the pressurized medium by water inclusion.

Figure 3:
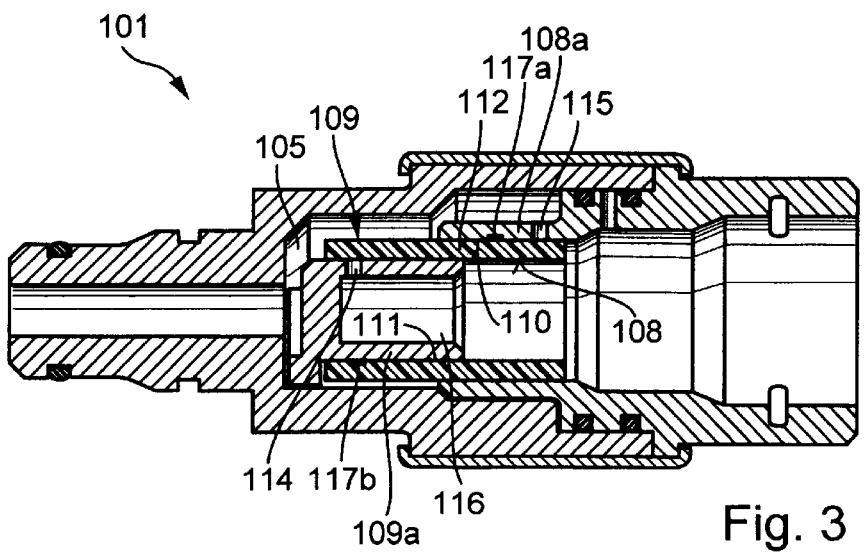
FIG. 3 is a cross-sectional view of another embodiment of a pulsation filter.

FIG. 3 shows a further advantageous embodiment of a pulsation filter 101, which is identical with the pulsation filter of FIG. 2 except for the differences that are described in the following. In this embodiment, only a single tube section 112 is provided, instead of the two tube sections 12, 13 of FIG. 2, and is utilized for both pressure relief valves 108, 109, wherein a division of the two chambers 105, 116 is achieved by only tube section 112, namely radially inside the hollow cylindrical component 108a and radially outside the hollow cylindrical component 109a. The selection of materials for this tube section 112 can follow to such an extent that the tube section 112 can be installed in the absence of the pressure medium while preserving a gap 117a and/or 117b. This arrangement can be filled while bypassing the pressure relief valves 108, 109, and in that case with the application of vacuum. The subsequent swelling of the tube section 112 results in sealing of the two chambers 105, 116 from each other. It is to be understood that in principle the tube sections 12, 13, 112 can be made from a swellable material, and in such a manner that when in a condition in which they are not wetted by the pressure medium, they allow a passageway for the pressure medium between the bearing surfaces 10, 110 and/or 11, 111 while filling is taking place, and thereafter seal the ports 14, 15, or 114, 115, respectively, as a result of swelling.

Figure 4:
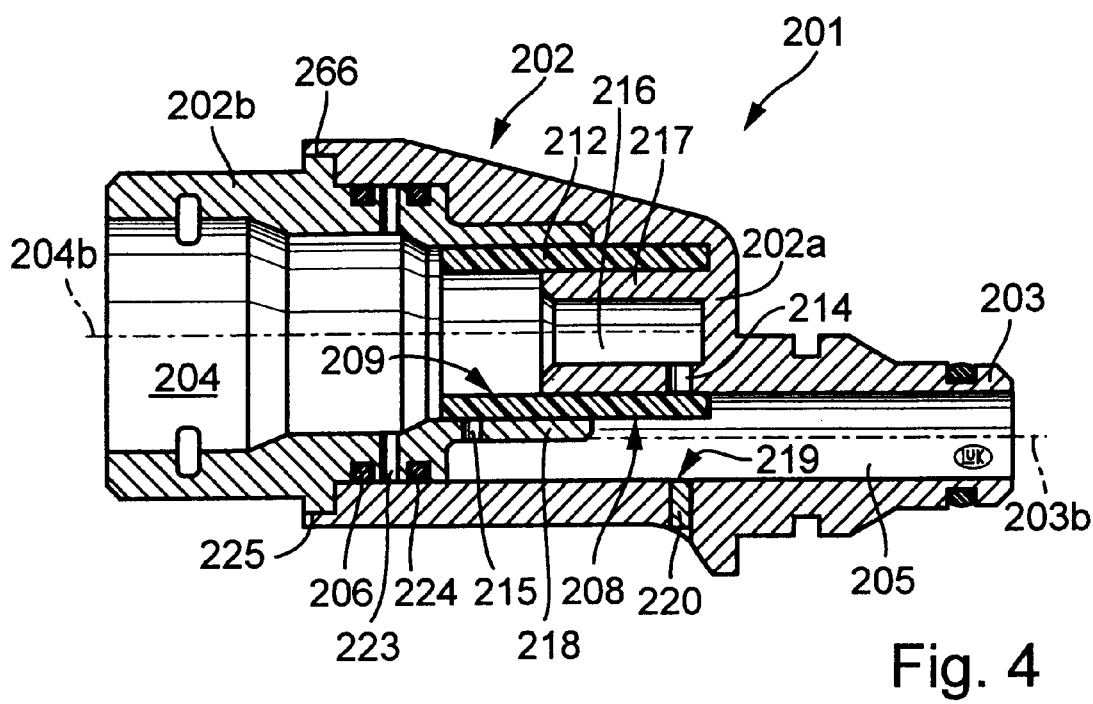
FIG. 4 is a cross-sectional view of a further embodiment of a pulsation filter.

FIG. 4 shows a pulsation filter 201 that is constructed in substantially the same way as the pulsation filters 1, 101 of FIGS. 2 and 3. The pulsation filter 201 is formed as a two-part housing 202 composed of the housing parts 202a, 202b, and a tube section 212 that is operative for both pressure relief valves 208 and 209, and that is mounted on an axially enlarged flange 217 that is arranged on the axis 204b, in which the port 214 of the pressure relief valve 208 is provided to establish communication between the chambers 205, 216. Further, the tube section 212 is in contacting engagement with an axially enlarged flange 218 which is arranged on the axis 204b, and in which the port 215 is provided to constitute the second pressure relief valve 209, which is opposite to the direction of the pressure, whereby the two flanges 217, 218 axially overlap to form a sealing surface between the two chambers 205, 216. In the embodiment 201, the axis 203b of the end connection 203 is radially offset relative to the axis 204b of the end connection 204. This feature can be advantageous in all pulse filters because, for example, axial space can be saved.

Preferably the housing parts of the pulsation filter in accordance with the invention, for example the housing parts 202a, 202b, are made from plastic, such as by an injection molding process. To produce the port 214 an opening 219 is formed in the housing 202a, for example by drilling or stamping, and thereupon, or in another operation, the port 214 is provided. Following that operation, the opening 219 can again be closed by means of a stopper 220, for example by an ultrasonic welding process, bonding, pressing, and the like, whereby the stopper 220 can also be directly provided by an adhesive, resin, or by the same material as that of the housing part 202a. It is to be understood that other predominantly radially-directed apertures, which are difficult to produce in a conventional, economical manner by injection molding apparatus, for example to produce in a one-step operation the port 215 of the housing 202, and/or the port 223, provided to bridge the chambers 205, 216 during the filling process as long as the sealing ring 224 has not yet swollen under the effect of the pressure medium, can be made in the same way and that thereupon the housing 2 can be correspondingly resealed. It can also be advantageous in special cases to manufacture injection-molding tools to produce a single-part version of a pulsation filter, the ports of which can be provided by radially operative core members.

To seal the two-part housings of pulsation filters such as that shown in FIG. 4, for example, it is advantageous to inspect the sealing ring 206 for damage during as well as after installation, and also to check that it is indeed installed. Conventional testing devices can be used to perform a check of the pressure and flow parameters, and/or injection tests can be utilized with the application of the pressure medium or another test fluid, such as, for example, water, air, alcohol, helium, or the like. In order to obtain an accurate correlation of the test parameters with the sealing effectiveness of the sealing ring, the mutually contacting housing parts 202a, 202b can advantageously be provided with a given gap dimension, that is comparatively pervious to the pressure medium operating against the sealing effect of the sealing ring 206 in sealing or defective condition, that is, at least negligibly pervious sealing behavior. Moreover, it can be advantageous to provide a basic increase in the gap dimension in the area of the connection between the sealing ring 206 and the housing closure, or one or more circumferentially distributed slots 225 can be provided which permit approximately free passage of the pressure medium or the test fluid to the outside, or depending upon the test construction, to the inside, for a defective sealing ring, compared with the sealing function of the sealing ring.

The axial connection of the two housing parts, as already discussed above in relation to the pulsation filter 1 of FIG. 2, is possible by means of a casing described there in more detail, or by means of a snap catch 266 shown here, or by means of a known bayonet catch, wherein the snap catch 266 can be fitted at one of the two housing parts 202a, 202b with a radially enlarged rotating snap projection, or several circumferential segments, in which the complementary housing part can snap into place by means of an undercut or by means of one or more complementary indexing or snap-in hooks that are complementary to the snap projection.

Figure 5:
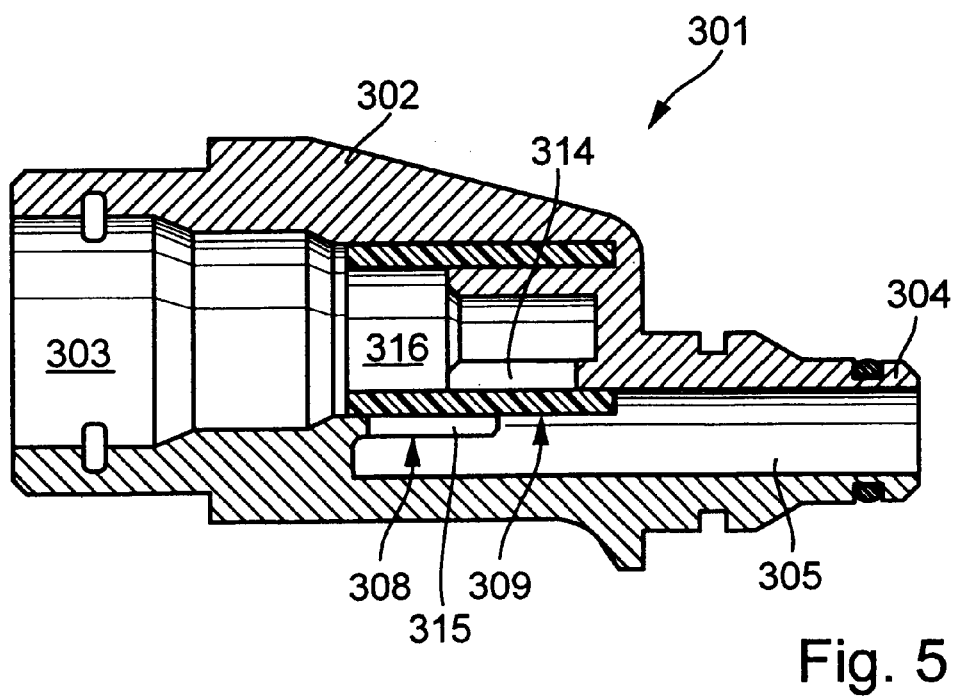
FIG. 5 is a cross-sectional view of a still further embodiment of a pulsation filter.

FIG. 5 shows a cross-sectional view of a pulsation filter 301, the unitary housing 302 of which can be made, for example, from plastic by an injection molding process. Illustratively, to avoid the need to manufacture ports associated with the pressure relief valves 308, 309 in a radial form, the ports 314, 315 are axially open in one direction to the end connections 303, 304, so that injection molds without complex sliding devices can be produced, and additional processing of the housing to make the ports is eliminated. It is to be understood that for reasons of sturdiness, for example, ports 314, 315 can be circumferentially displaced to be opposite from each other, and that several ports 314, 315 can advantageously be allocated and distributed about the chambers 305, 316 as circumferential elements.

The claims included in the application are illustrative and are without prejudice to acquiring wider patent protection. The applicant reserves the right to claim additional combinations of features disclosed in the specification and/or drawings.

The references contained in the dependent claims point to further developments of the object of the main claim by means of the features of the particular claim; they are not to be construed as renunciation to independent, objective protection for the combinations of features of the related dependent is claims.

Although the subject matter of the dependent claims can constitute separate and independent inventions in the light of the state of the art on the priority date, the applicants reserve the right to make them the subject of independent claims or separate statements. They can, moreover, also embody independent inventions that can be produced from the independent developments of the subject matter of the included dependent claims.

The exemplary embodiments are not to be considered to be limitations of the invention. On the contrary, many changes and variations are possible within the scope of the invention in the existing disclosure, in particular such variants, elements, and combinations and/or materials which, for example, are inventive by combining or modifying single features that are in combination and are described individually in relation to the general specification and embodiments as well as the claims and shown in the drawings, as well as elements or method steps that can be derived by a person skilled in the art in the light of the disclosed solutions of the problem, and which by means of combined features lead to a new object or new method steps or sequences of method steps, as well as manufacturing, testing and operational procedures.

What is claimed is:

1. A hydraulic system for motor vehicles, said hydraulic system comprising: a master cylinder, a slave cylinder, a fluid conduit connecting said cylinders for carrying a pressure-transmitting fluid, and at least one pressure relief valve positioned in the conduit between the cylinders and having a valve inlet and a valve outlet, wherein the relief valve is operable in response to fluid pressure and includes at least one port between the valve inlet and the valve outlet to provide fluid communication between the valve inlet and the valve outlet, wherein an elastic body in the form of a tubular member overlies the at least one port to block flow therethrough and to allow flow through the port when the pressure of the fluid on one side of the valve exceeds a predetermined pressure value, to cause the elastic body to move away from the port and allow flow therethrough.

2. A hydraulic system as claimed in claim 1, wherein the port has two openings and at least one of the two openings of the port is sealed by the elastic body.

3. A hydraulic system as claimed in claim 2, wherein the at least one port extends transversely relative to the valve inlet and valve outlet axes and at least one of the port openings is sealed by the elastic body.

4. A hydraulic system as claimed in claim 1, wherein the fluid pressure acting on the tubular member operates to press the tubular member against the port opening.

5. A hydraulic system as claimed in claim 1, wherein the elastic body is made from a material selected from the group consisting of plastics, elastomers, rubbers, silicone rubber, and a silicone resin.

6. A hydraulic system as claimed in claim 1, wherein the elastic body includes a reinforcement element.

7. A hydraulic system as claimed in claim 6, wherein the reinforcement element is selected from the group consisting of fabrics, metals, and plastics.

8. A hydraulic system as claimed in claim 1, wherein at least two spaced ports are provided in a flow path of the fluid between the valve inlet and the valve outlet, and each port is blocked by an elastic member.

9. A hydraulic system as claimed in claim 1, wherein the at least one pressure relief valve is carried in a housing that includes two mutually joined and sealed and axially abutting housing parts.

10. A hydraulic system as claimed in claim 9, wherein at least one housing part is made of injection molded plastic.

11. A hydraulic system as claimed in claim 9, wherein the two housing parts are non-rotatably connected.

12. A hydraulic system as claimed in claim 1, wherein the hydraulic system is included in a disengagement device of a clutch in a power train that includes an internal combustion engine having a crankshaft and a transmission input shaft.

13. A hydraulic system as claimed in claim 1, wherein the hydraulic system is a motor vehicle braking system.

14. A hydraulic system as claimed in claim 1, wherein two oppositely acting pressure relief valves are carried in one housing.

15. A hydraulic system as claimed in claim 1, wherein the at least one pressure relief valve damps vibrations of pressure-transmitting fluid having a frequency of less than about 1 kHz.

16. A hydraulic system as claimed in claim 15, wherein the damping frequency range is between about 80 Hz and about 200 Hz.

17. A hydraulic system as claimed in claim 1, wherein at least the slave cylinder is operated at a residual pressure that is operative at least in a rest condition of the hydraulic system.

18. A hydraulic system as claimed in claim 1, wherein the tubular member has an axis that is substantially parallel to at least one of an inlet port axis and an outlet port axis.

19. A hydraulic system for motor vehicles, said hydraulic system comprising: a master cylinder, a slave cylinder, a fluid conduit connecting said cylinders for carrying a pressure-transmitting fluid, and at least one pressure relief valve positioned in the conduit between the cylinders and having a valve inlet and a valve outlet, wherein the relief valve is operable in response to fluid pressure and includes at least one port between the valve inlet and the valve outlet to provide fluid communication between the valve inlet and the valve outlet, wherein an elastic body overlies the at least one port to block flow therethrough and to allow flow through the port when the pressure of the fluid on one side of the valve exceeds a predetermined pressure value, to cause the elastic body to move away from the port and allow flow therethrough, and wherein the valve inlet and the valve outlet are substantially coaxial and the at least one port extends transversely relative to the valve inlet and valve outlet axis.

20. A hydraulic system for motor vehicles, said hydraulic system comprising: a master cylinder, a slave cylinder, a fluid conduit connecting said cylinders for carrying a pressure-transmitting fluid, and at least one pressure relief valve positioned in the conduit between the cylinders and having a valve inlet and a valve outlet, wherein the relief valve is operable in response to fluid pressure and includes at least one port between the valve inlet and the valve outlet to provide fluid communication between the valve inlet and the valve outlet, wherein an elastic body overlies the at least one port to block flow therethrough and to allow flow through the port when the pressure of the fluid on one side of the valve exceeds a predetermined pressure value, to cause the elastic body to move away from the port and allow flow therethrough, and wherein the valve includes an internal cylindrical member having an inner surface that communicates with one of the valve inlet and the valve outlet, and an outer surface that communicates with the other of the valve inlet and the valve outlet, and the port extends substantially radially through a wall of the cylindrical member, and the elastic body is a tubular member that engages one of the outer surface and the inner surface of the cylindrical member.

21. A hydraulic system as claimed in claim 20, wherein the tubular member engages the inner surface of the cylindrical member.

22. A hydraulic system as claimed in claim 20, wherein the tubular member is restrained from axial movement relative to the cylindrical surface.

23. A hydraulic system as claimed in claim 22, wherein the cylindrical surface includes a circumferential groove for receiving one end of the tubular member.

24. A hydraulic system as claimed in claim 22, wherein an axially directed circumferential rim is provided at a radial distance from a cylindrical surface to allow radial engagement of an end of the tube member between the rim and the cylindrical surface.

25. A hydraulic system as claimed in claim 20, wherein the internal cylindrical member is carried by one of two housing parts that define the pressure relief valve.

26. A hydraulic system for motor vehicles, said hydraulic system comprising: a master cylinder, a slave cylinder, a fluid conduit connecting said cylinders for carrying a pressure-transmitting fluid, and at least one pressure relief valve positioned in the conduit between the cylinders and having a valve inlet and a valve outlet, wherein the relief valve is operable in response to fluid pressure and includes at least one port between the valve inlet and the valve outlet to provide fluid communication between the valve inlet and the valve outlet, wherein an elastic body overlies the at least one port to block flow therethrough and to allow flow through the port when the pressure of the fluid on one side of the valve exceeds a predetermined pressure value, to cause the elastic body to move away from the port and allow flow therethrough, wherein the elastic body includes a reinforcement element, and wherein the reinforcement element is selected from the group consisting of woven fabric materials, spiral wound materials, and annular elements.

27. A hydraulic system for motor vehicles, said hydraulic system comprising: a master cylinder, a slave cylinder, a fluid conduit connecting said cylinders for carrying a pressure-transmitting fluid, and at least one pressure relief valve positioned in the conduit between the cylinders and having a valve inlet and a valve outlet, wherein the relief valve is operable in response to fluid pressure and includes at least one port between the valve inlet and the valve outlet to provide fluid communication between the valve inlet and the valve outlet, wherein an elastic body overlies the at least one port to block flow therethrough and to allow flow through the port when the pressure of the fluid on one side of the valve exceeds a predetermined pressure value, to cause the elastic body to move away from the port and allow flow therethrough, wherein at least two spaced ports are provided in a flow path of the fluid between the valve inlet and the valve outlet and each port is blocked by an elastic member, and wherein the ports are spaced axially from each other relative to the valve inlet axis.

28. A hydraulic system for motor vehicles, said hydraulic system comprising: a master cylinder, a slave cylinder, a fluid conduit connecting said cylinders for carrying a pressure-transmitting fluid, and at least one pressure relief valve positioned in the conduit between the cylinders and having a valve inlet and a valve outlet, wherein the relief valve is operable in response to fluid pressure and includes at least one port between the valve inlet and the valve outlet to provide fluid communication between the valve inlet and the valve outlet, wherein an elastic body overlies the at least one port to block flow therethrough and to allow flow through the port when the pressure of the fluid on one side of the valve exceeds a predetermined pressure value, to cause the elastic body to move away from the port and allow flow therethrough, wherein at least two spaced ports are provided in a flow path of the fluid between the valve inlet and the valve outlet and each port is blocked by an elastic member, and wherein each elastic member blocks fluid flow from a different direction relative to the valve inlet.

29. A hydraulic system for motor vehicles, said hydraulic system comprising: a master cylinder, a slave cylinder, a fluid conduit connecting said cylinders for carrying a pressure-transmitting fluid, and at least one pressure relief valve positioned in the conduit between the cylinders and having a valve inlet and a valve outlet, wherein the relief valve is operable in response to fluid pressure and includes at least one port between the valve inlet and the valve outlet to provide fluid communication between the valve inlet and the valve outlet, wherein an elastic body overlies the at least one port to block flow therethrough and to allow flow through the port when the pressure of the fluid on one side of the valve exceeds a predetermined pressure value, to cause the elastic body to move away from the port and allow flow therethrough, wherein at least two spaced ports are provided in a flow path of the fluid between the valve inlet and the valve outlet and each port is blocked by an elastic member, and wherein each elastic member opens its associated port at a different fluid pressure level.

30. A hydraulic system for motor vehicles, said hydraulic system comprising: a master cylinder, a slave cylinder, a fluid conduit connecting said cylinders for carrying a pressure-transmitting fluid, and at least one pressure relief valve positioned in the conduit between the cylinders and having a valve inlet and a valve outlet, wherein the relief valve is operable in response to fluid pressure and includes at least one port between the valve inlet and the valve outlet to provide fluid communication between the valve inlet and the valve outlet, wherein an elastic body overlies the at least one port to block flow therethrough and to allow flow through the port when the pressure of the fluid on one side of the valve exceeds a predetermined pressure value, to cause the elastic body to move away from the port and allow flow therethrough, wherein at least two spaced ports are provided in a flow path of the fluid between the valve inlet and the valve outlet and each port is blocked by an elastic member, and wherein one elastic member contacts an outer cylindrical surface and another elastic member contacts an inner cylindrical surface, and wherein each tubular member is responsive to a different fluid pressure for opening its respective port.

31. A hydraulic system for motor vehicles, said hydraulic system comprising: a master cylinder, a slave cylinder, a fluid conduit connecting said cylinders for carrying a pressure-transmitting fluid, and at least one pressure relief valve positioned in the conduit between the cylinders and having a valve inlet and a valve outlet, wherein the relief valve is operable in response to fluid pressure and includes at least one port between the valve inlet and the valve outlet to provide fluid communication between the valve inlet and the valve outlet, wherein an elastic body overlies the at least one port to block flow therethrough and to allow flow through the port when the pressure of the fluid on one side of the valve exceeds a predetermined pressure value, to cause the elastic body to move away from the port and allow flow therethrough, wherein at least two spaced ports are provided in a flow path of the fluid between the valve inlet and the valve outlet and each port is blocked by an elastic member, and wherein the elastic members are tubular members and have substantially the same outer and inner diameters.

32. A hydraulic system as claimed in claim 31, wherein at least one tubular member is installed in a prestressed condition.

33. A hydraulic system as claimed in claim 31, wherein at least one tubular member is a multi-ply structure.

34. A hydraulic system for motor vehicles, said hydraulic system comprising: a master cylinder, a slave cylinder, a fluid conduit connecting said cylinders for carrying a pressure-transmitting fluid, and at least one pressure relief valve positioned in the conduit between the cylinders and having a valve inlet and a valve outlet, wherein the relief valve is operable in response to fluid pressure and includes at least one port between the valve inlet and the valve outlet to provide fluid communication between the valve inlet and the valve outlet, wherein an elastic body overlies the at least one port to block flow therethrough and to allow flow through the port when the pressure of the fluid on one side of the valve exceeds a predetermined pressure value, to cause the elastic body to move away from the port and allow flow therethrough, and including a temporary bypass path that extends between the valve inlet and the valve outlet.

35. A hydraulic system as claimed in claim 34, wherein after first-time filling of the hydraulic system, the bypass path is closed.

36. A hydraulic system as claimed in claim 34, wherein the bypass path is closed by a sealing member that swells when in contact with pressure-transmitting fluid.

37. A hydraulic system as claimed in claim 36, wherein the sealing member seals the two housing halves in a radial direction.

38. A hydraulic system as claimed in claim 37, wherein the sealing member is positioned axially adjacent to a housing seal that seals the two housing parts.

39. A hydraulic system as claimed in claim 38, including a port connecting the valve inlet and the valve outlet is positioned axially between the sealing member and the housing seal.

40. A hydraulic system for motor vehicles, said hydraulic system comprising: a master cylinder, a slave cylinder, a fluid conduit connecting said cylinders for carrying a pressure-transmitting fluid, and at least one pressure relief valve positioned in the conduit between the cylinders and having a valve inlet and a valve outlet, wherein the relief valve is operable in response to fluid pressure and includes at least one port between the valve inlet and the valve outlet to provide fluid communication between the valve inlet and the valve outlet, wherein an elastic body overlies the at least one port to block flow therethrough and to allow flow through the port when the pressure of the fluid on one side of the valve exceeds a predetermined pressure value, to cause the elastic body to move away from the port and allow flow therethrough, wherein the at least one pressure relief valve damps vibrations of pressure-transmitting fluid having a frequency of less than about 1 kHz, and wherein the at least one pressure relief valve damps vibrations transmitted by an internal combustion engine of a motor vehicle.

41. A hydraulic system for motor vehicles, said hydraulic system comprising: a master cylinder, a slave cylinder, a fluid conduit connecting said cylinders for carrying a pressure-transmitting fluid, and at least one pressure relief valve positioned in the conduit between the cylinders and having a valve inlet and a valve outlet, wherein the relief valve is operable in response to fluid pressure and includes at least one port between the valve inlet and the valve outlet to provide fluid communication between the valve inlet and the valve outlet, wherein an elastic body overlies the at least one port to block flow therethrough and to allow flow through the port when the pressure of the fluid on one side of the valve exceeds a predetermined pressure value, to cause the elastic body to move away from the port and allow flow therethrough, wherein two oppositely acting pressure relief valves are carried in one housing, and including a unitary elastic member that overlies each of two spaced ports, wherein the elastic member swells when in contact with pressure-transmitting fluid to seal a gap within the relief valve that when in an unsealed condition allows flow of pressure-transmitting fluid between the valve inlet and the valve outlet.

42. A hydraulic system as claimed in claim 41, wherein the seal material is NBR.

\* \* \* \* \*